United States Patent
Shipley et al.

[15] 3,638,428
[45] Feb. 1, 1972

[54] BYPASS VALVE MECHANISM

[72] Inventors: Gerald E. Shipley; Robert R. Girard, both of Cincinnati, Ohio

[73] Assignee: General Electric Company

[22] Filed: May 4, 1970

[21] Appl. No.: 34,071

[52] U.S. Cl. ...............................60/226, 60/39.29, 415/145
[51] Int. Cl. ......................................F02k 3/04, F04d 27/02
[58] Field of Search..............60/226, 262, 269, 39.07, 39.16, 60/39.29; 415/144, 145, 150

[56] References Cited

UNITED STATES PATENTS

| | | | |
|---|---|---|---|
| 3,030,006 | 4/1962 | Shoup.....................................415/145 |
| 3,057,541 | 10/1962 | Hasbrouck..............................415/145 |
| 3,091,080 | 5/1963 | Crim.......................................60/39.29 |
| 3,094,270 | 6/1963 | Kent.......................................415/145 |
| 3,240,012 | 3/1966 | Price......................................415/144 |

*Primary Examiner*—Douglas Hart
*Attorney*—Derek P. Lawrence, Erwin F. Berrier, Jr., Lee H. Sachs, Frank L. Neuhauser, Oscar B. Waddell and Joseph B. Forman

[57] ABSTRACT

A bypass valve arrangement for a gas turbine engine having two independently rotatable axial flow compressors arranged in serial flow relationship along a common flow passage, the valve arrangement includes a plurality of bypass passages opening to the flow passage intermediate the compressors. Each bypass passage is provided with a hinged valve member which is movable between a closed position, wherein the valve member forms a streamline continuation of the passage outer wall, and a variably open position. Means including an actuator, unison ring and bellcranks are provided for positioning the valve members.

8 Claims, 3 Drawing Figures

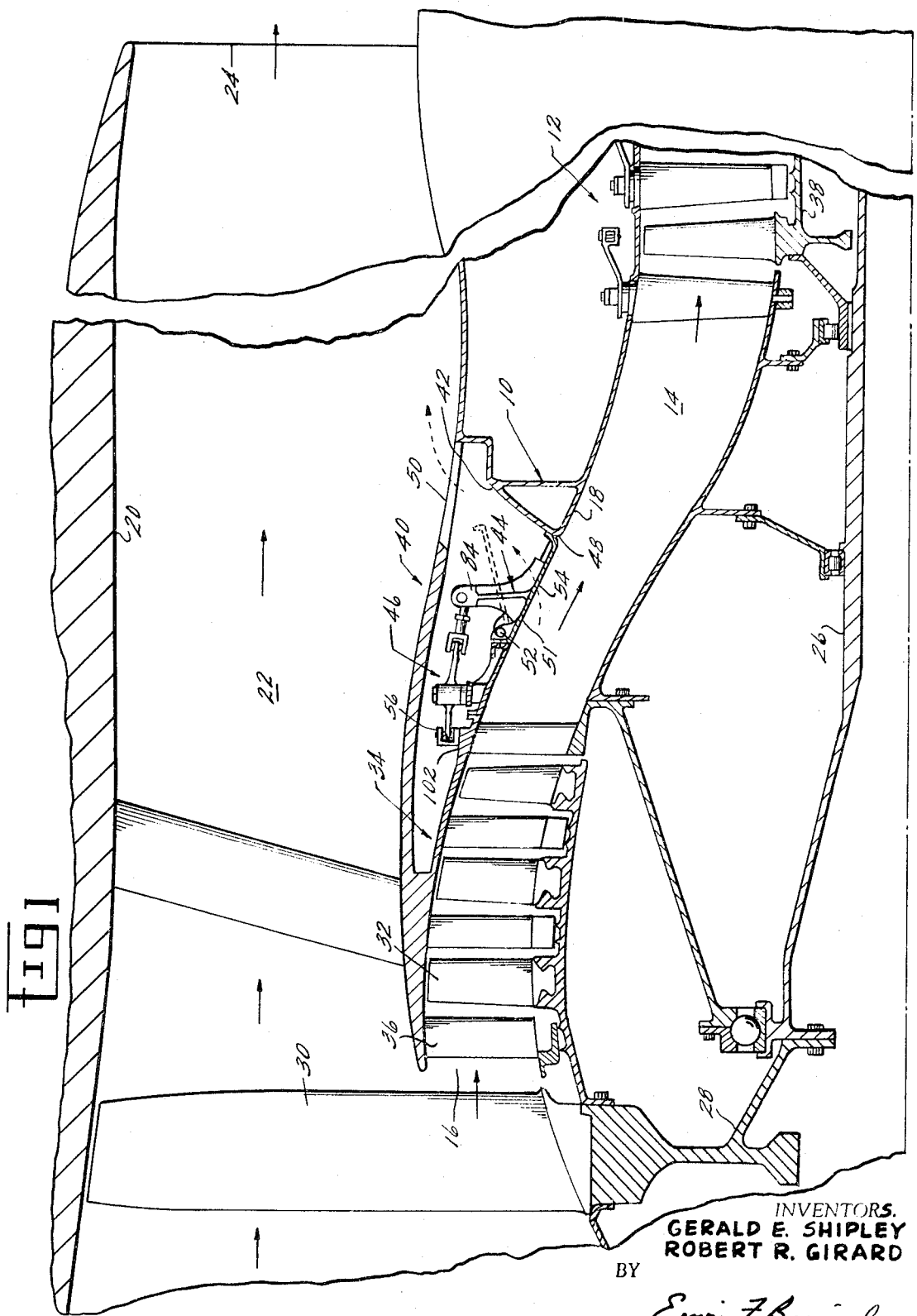

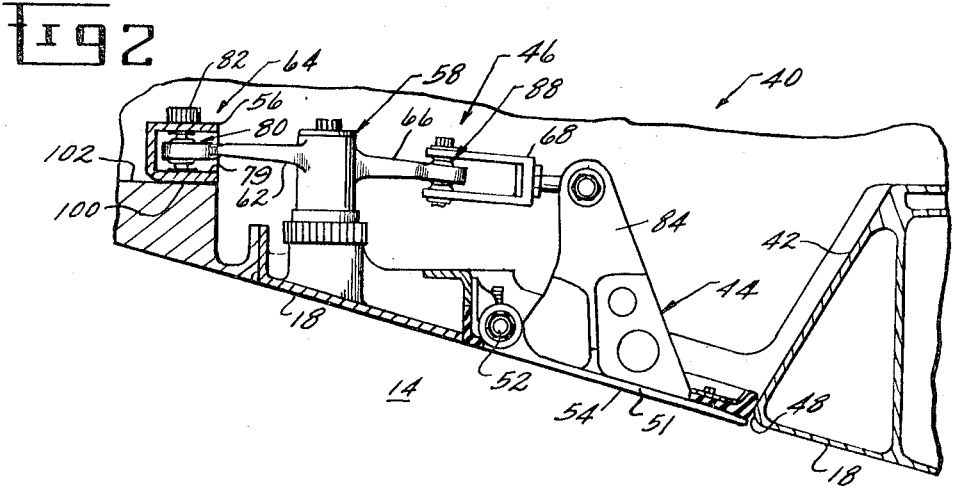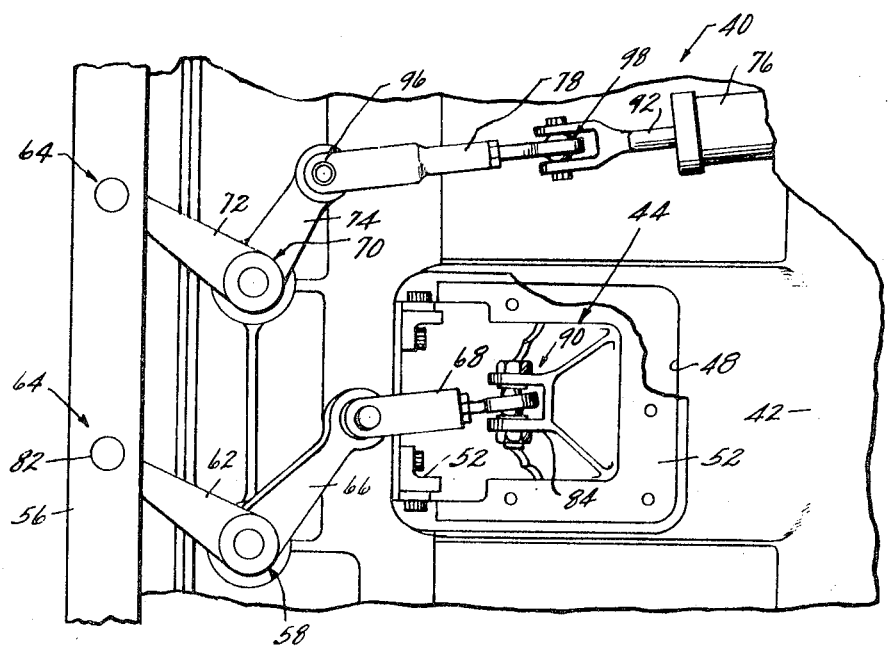

BYPASS VALVE MECHANISM

This invention relates to gas turbine engines and, more particularly, to a bleed or bypass valve mechanism for use therein.

When two or more independently rotatable axial flow compressor rotors are utilized to pressurize fluid flow within a common fluid flow path, it is often desirable to provide means to bypass or extract a portion of the fluid pressurized by the upstream compressor, during off-design operation, so as to prevent an efficiency loss or an aerodynamic stall condition from occurring in the upstream compressor due to an oversupply of pressurized fluid to the downstream compressor and a resultant back pressuring of the upstream compressor.

In gas turbine engines, the amount of pressurized fluid to be bypassed or extracted for such purposes will generally vary throughout the engine's operating regime. It is therefore desirable that the bypass means employed be adapted to modulate the bypass flow. Additionally, since weight and size are of primary concern in aircraft gas turbine engines, it is extremely important that the bypass valve mechanism have a small radial extent or profile and be of ruggedized, lightweight construction.

A primary object of this invention, therefore, is to provide a bleed valve mechanism for use in fluid apparatus having at least two independently rotatable axial flow compressor rotors adapted to pressurize a fluid stream in a common compressor flow path.

Another object of this invention is to provide a bleed valve mechanism, as above, which is of small radial profile and of ruggedized, lightweight construction.

Other objects and advantages of the present invention will become apparent upon reading the following description of the preferred embodiment.

Briefly, this invention provides a bypass valve mechanism for use in a gas turbine engine of the type having a suitable engine casing defining a portion of an annular compressor flow passage within which low- and high-pressure compressor means are serially disposed to pressurize fluid flow therethrough. A plurality of circumferentially spaced, generally radially extending bypass passages, having inlets communicating with the compressor flow passage intermediate the low- and high-pressure compressor means, are formed through the casing structure. A valve member is hingeably connected to the casing structure adjacent each said bypass passage inlet for closing and variably opening communication between each bypass passage and the annular flow passage. Means are provided for rotating or selectively positioning, in unison, each valve member, which means preferably comprise a unison ring, drivingly connected to each valve member through linkage members and radially rotatable bellcranks, and means to actuate the unison ring. Each valve member includes a valve plate which is preferably arranged and formed so as to define a generally streamline continuation of the casing wall member defining the outer surface of the compressor flow passage.

While the specification concludes with claims particularly pointing out and distinctly claiming the subject matter of this invention, it is believed that the invention will be better understood upon reading the following description of the preferred embodiment taken in connection with the accompanying drawings, wherein:

FIG. 1 is a partial, half cross-sectional view of a turbofan engine employing the bypass valve mechanism of this invention;

FIG. 2 is an enlarged cross-sectional view of the bypass valve mechanism of FIG. 1; and FIG. 3 is a partial plan view of FIG. 2.

Referring now to the drawings and particularly to FIG. 1, the forward portion of a turbofan engine has been generally shown as comprising a core engine including a casing or supporting structure 10 which supports and encloses high-pressure, axial flow compressor means 12 and defines at least a portion of an annular core engine or compressor flow passage 14. The passage 14 is formed with an inlet 16 at its upstream end, and is defined, in part, by a generally streamlined outer surface 18. An annular fan casing 20 is telescoped over the upstream end of the core engine casing and is spaced radially outwardly thereof so as to define an annular fan duct passage 22 therebetween having an exhaust nozzle 24 at its downstream end. The core engine casing supports an inner shaft 26 which extends generally coaxially within the high-pressure compressor means 12 and carries a fan rotor 28 at its upstream end. The fan rotor 28 includes a stage of long fan blades 30 and a plurality of axially downstream spaced stages of smaller blades 32. The fan blades 30 extend across the fan duct 22 while the smaller blades 32 extend across the compressor flow path 14 and define low-pressure compressor means 34 in cooperation with spaced, alternating stages of vanes 36.

The high-pressure compressor means 12 includes a high-pressure rotor 38 which, in cooperation with the core engine-casing structure 10 and the fan rotor 28, defines the upstream portion of the compressor flow passage 14.

In operation, a portion of fluid pressurized by the large fan blades 30 is exhausted through nozzle 24 to provide propulsive thrust for the turbofan engine and a portion enters the inlet 16 for further pressurization by low- and high-pressure compressor means 34 and 12. As will be understood, the turbofan engine of FIG. 1 includes a combustor (not shown), for receiving the pressurized fluid from compressor means 12 and generating a hot gas stream, and suitable, independently rotatable, serially disposed high- and low-pressure turbine means (not shown) for extracting energy from the hot gas stream and rotatably driving the rotors 38 and 28, respectively. Such arrangements are well known in the art and, accordingly, have not been shown. Since rotors 28 and 38 are independently rotatable, during certain off-design operating conditions, such as may occur during deceleration of the turbofan engine, the flow rate of pressurized fluid discharged by low-pressure compressor means 34 may exceed the flow rate required by the high-pressure compressor. When such an aerodynamic mismatch occurs, the resultant back pressuring of the low-pressure compressor may adversely affect its efficiency and produce stall.

To the end of providing the ability to match the flow rate of pressurized fluid delivered to the high-pressure compressor means 12 with its fluid requirements throughout the operation regime of the turbofan engine, a bypass valve mechanism 40 is provided to bypass the excess flow into the fan duct passage 22 for efflux through nozzle 24. As generally shown in FIG. 1, the bypass valve mechanism 40 includes a plurality of generally radially extending, circumferentially spaced bypass passages 42, a plurality of valve members 44, which are movable to and from a position closing and variably opening the bypass passages 42, and means 46 for moving the valve members 44.

Each bypass passage 42 has been shown as being generally rectangular in cross section and includes an inlet 48, communicating with the compressor flow annulus 14, intermediate compressors 12 and 34, and an outlet 50 communicating with the fan duct passage 22.

Each valve member 44 includes a generally rectangular valve plate 51 which is hingeably connected to the core engine structure 10, as at 52, for rotation to and from a position closing and variably opening its respective bypass passage 42.

As best shown in FIG. 2, each hinge connection 52 is preferably located adjacent the upstream edge of its respective valve member 44 and adjacent bypass passage inlet 48, with the valve plate 51 preferably formed with an inner surface 54 which is adapted to form a generally streamline continuation of the passage 14 outer surface 18 when the valve member is disposed in its closed position. By so arranging and forming the valve member, disturbances to the pressurized fluid flowing in passage 14, and efficiency losses associated therewith, are greatly reduced.

With reference now to FIGS. 2 and 3, the valve member rotating means 46 has been shown as including a unison ring 56 disposed upstream of the valve members 44, and a plurality of bellcrank assemblies 58. The bellcrank assemblies 58 are journaled to the core engine structure 10, intermediate the unison ring and the valve members 44, for rotation about an axis generally radial of the longitudinal axis of the engine or the passage 14. Each bellcrank assembly 58 includes a first arm 62 which extends upstream of its rotational axis and is pivotally connected adjacent its distal end, as at 64, to the unison ring 56. Each bellcrank assembly further includes a second crank arm 66 which extends downstream of its rotational axis and is pivotally connected to a valve member 44 through a suitable linkage member 68, so that as the unison ring 56 is rotated about and translated along the engine longitudinal axis, each valve member 44 will be pivoted about its hinge connection 52.

With reference now to FIG. 3, means for rotating the unison ring have been shown as comprising at least one drive bellcrank assembly 70 having a first arm 72 which is pivotally connected to the unison ring 56, and a second arm 74 which is pivotally connected to suitable fluid or mechanical actuator means 76 through a suitable link member 78.

As best shown in FIG. 2, the unison ring 56 is generally C-shaped in cross section and defines an axially downstream-facing circumferential groove 79 for receiving the distal end of each crank arm 62, 72 with sufficient radial clearance to permit relative radial movement therebetween. Each pivotal connection 64 preferably includes a spherical ball joint 80 carried by the crank arms 62, 72 which is secured to the unison ring 56 by a radially disposed trunnion bolt 82 which is sized to permit free radial slippage between the ball joint and the bolt. In this manner, the ball joints 80 accommodate relative rotational movement between the unison ring 56 and the arms 62, 72 which occurs about the longitudinal axis of each arm, while the relative radial movement between the unison ring 56 and the crank arms 62, 72 is accommodated by radial slippage of the ball joints 80 along the radial axes of trunnion bolts 82.

The crank arm 66 of each bellcrank assembly 58 is preferably connected to a lug 84 which projects radially outwardly from each valve plate 51 through the link member 68 and ball joints 88 and 90, with the primary pivotal axis of the ball joint 88 being generally radial of the engine longitudinal axis and the primary pivotal axis of ball joint 90 being generally parallel to the hinge connection 52.

In a similar manner, the crank arm 74 of each drive bellcrank assembly 70 is connected to a piston rod 92 of actuator means 76 through a suitable link member 78 and ball joints 96 and 98.

The unison ring 56 is preferably formed with a cylindrical inner surface 100 which is adapted to slidingly and telescopingly engage a cylindrical track 102 defined by the core engine structure 10 so as to provide support for the unison ring.

To minimize friction between the unison ring and the cylindrical track 102, either the track, the inner cylindrical surface 100, or both may be coated with a suitable low-friction material such as nylon, tetrafluoro ethylene or the like.

In operation, when it is desired to bypass a given amount of pressurized air from the compressor flow annulus 14, actuator means 76 drives the bellcrank assemblies 70 counterclockwise (as viewed in FIG. 3) through link member 78 and ball joints 96, 98, to rotate unison ring 56 and translate it along cylindrical track 102. In response to such movement of unison ring 56, each bellcrank assembly 58 rotates counterclockwise (as viewed in FIG. 3) in unison about its radial axis and hence effects unison rotation of each valve member 44 about its hinge connection 52 to or from its closing or variably open position through bellcrank arms 66, linkage member 68 and ball joints 88 and 90. Since the pressure downstream of low-pressure compressor means 34 is greater than that within the passage 22, downstream of the long blades 30, when the valve members 44 are out of their closing positions, a bypass flow will be established from passage 14 to passage 22 with the bypass flow rate being proportional to the pressure differential between passages 14 and 22 and the area of the valve opening. Accordingly, by varying the rotational attitude or open position of valve member 44, the bypass flow rate may be modulated to match the flow rate delivered to high-pressure compressor 12 with its requirements throughout the engine-operating regime.

By positioning the bypass passage inlet 48 in spaced flow relationship to both the low- and high-pressure compressor means 34 and 12, the diffusion or loading effect on such compressors due to boundary separation is greatly reduced.

While a preferred embodiment of the present invention has been depicted and described, it will be appreciated by those skilled in the art that many additions, modifications and changes may be made thereto without departing from the invention's fundamental theme.

What is claimed is:

1. In a gas turbine engine of the type having a casing structure supporting first and second independently rotatable compressor rotors arranged in serial flow relationship for pressurizing fluid in an annular passage, the improvement comprising:

means for selectively bypassing a predetermined and variable portion of the fluid pressurized by said first compressor rotor, said means including a plurality of circumferentially spaced bypass passages formed through said casing structure and communicating with said annular passage, a valve member for each said bypass passage, each said valve member hingeably connected to said casing structure for rotation to and from a position closing its respective bypass passage, and means for rotating said valve members in unison about their hinge connections to close or variably open communication between said annular passage and said bypass passages, said valve member rotating means comprising a unison ring disposed within said casing structure and extending generally coaxially around said annular passage, a bellcrank for each said valve member, each said bellcrank secured to said casing structure for rotation about an axis generally radial of said annular passage and having a first arm pivotally connected to said unison ring and a second arm pivotally and linkably connected to said valve member, and means for rotating said unison ring.

2. The improved gas turbine engine of claim 1 further characterized in that said unison ring rotating means comprise at least one drive bellcrank secured to said casing structure for rotation about an axis generally radial of said annular passage, said drive crank having a first and second arm projecting from its rotational axis, said first arm pivotally connected to said unison ring, and actuator means connected to said second arm of said drive crank.

3. The improved gas turbine engine of claim 1 further characterized in that said casing structure, in part, defines a streamline outer boundary for said annular passage, with said valve member adapted to define a generally streamline continuation of said outer boundary when disposed in said closing position.

4. The improved gas turbine engine of claim 1 further characterized by and including track means carried by said casing structure for supporting said unison ring, said unison ring formed with a cylindrical inner surface for slidingly and telescopingly engaging said track means.

5. A turbofan engine having a core engine casing projecting into an annular fan duct and defining an annular fan duct passage therebetween having an exhaust nozzle at its downstream end, said core engine casing defining, in part, an annular core engine flow passage having an inlet opening to said fan duct passage, first and second axial flow compressor means arranged in serial flow relationship along said core engine flow passage for pressurizing fluid flow therethrough, said core engine casing defining a generally streamline outer boundary for said core engine flow passage intermediate said first and second compressor means, a plurality of circumferentially spaced bypass passages formed through said core engine casing, each said bypass passage formed with an inlet opening to said core engine flow passage, intermediate said first and second compressor means, and an outlet opening to said fan duct passage, a valve member for each said bypass passage, each said valve member hingeably connected to said core engine casing structure for rotation between a position closing communication between its respective bypass passage and said core engine flow passage and a position variably opening said communication, said valve members adapted to form a generally streamline continuation of said core engine flow passage streamline outer boundary when in said closing position, and means for rotating said valve members in unison between said closing and variably open positions.

6. The turbofan engine of claim 6 further characterized in that each said valve member includes a generally rectangular valve plate, and a lug joining and projecting radially outwardly from each said valve plate, with said hinge connections disposed along the upstream edges of their respective valve plates and adjacent their respective bypass passage inlets, said valve member rotating means including a unison ring disposed within said casing upstream of said bypass passages, a bellcrank assembly for each said valve member journaled to said casing, intermediate said unison ring and said bypass passages, for rotation about an axis generally radial of the longitudinal axis of said core engine flow passage, each said bellcrank including a first arm extending from the bellcrank rotational axis and pivotally connected adjacent its distal end to said unison ring, and a second arm extending from the bellcrank rotational axis and pivotally and linkably connected adjacent its distal end to its respective valve member lug, whereby rotation of said unison ring about the longitudinal axis of said core engine flow path effects unison rotation of each said valve member about its hinge connection, and means for rotatably driving said unison ring about said core engine flow path longitudinal axis.

7. The turbofan engine of claim 6 further characterized in that said means for rotatably driving said unison ring includes at least one drive bellcrank journaled for rotation to said core engine casing about an axis generally radial of said core engine flow passage, said drive bellcrank including a first and a second arm projecting from said bellcrank rotational axis, said first drive crank arm pivotally connected adjacent its distal end to said unison ring, and actuator means, including a piston rod pivotally connected to said second drive crank arm adjacent its distal end.

8. The turbofan engine of claim 7 further characterized in that said unison ring is generally C-shaped in cross section and defines an axially downstream opening circumferential groove sized to receive the distal ends of said bellcrank first arms with sufficient clearance to permit relative radial movement therebetween each said first arm pivotal connection comprising ball joint means carried by said first arm and slidingly secured to said unison ring along an axis radial of said core engine flow passage.

* * * * *